United States Patent [19]
Bates et al.

[11] Patent Number: 5,378,733
[45] Date of Patent: Jan. 3, 1995

[54] SOUND ATTENUATING POLYMER COMPOSITES

[75] Inventors: Lester W. Bates; Eric P. Buchanan, both of Cross Junction, Va.

[73] Assignee: Seaward International, Inc., Clearbrook, Va.

[21] Appl. No.: 45,611

[22] Filed: Apr. 9, 1993

[51] Int. Cl.$^6$ .............. C08G 18/00; C08J 9/32
[52] U.S. Cl. .................. 521/54; 521/123; 521/137
[58] Field of Search .............. 521/54, 123, 137

[56] References Cited

U.S. PATENT DOCUMENTS

| | | |
|---|---|---|
| 3,855,049 | 12/1974 | Klein . |
| 3,993,608 | 11/1976 | Wells . |
| 4,082,702 | 4/1978 | Harper . |
| 4,097,423 | 6/1978 | Dieterich ............. 521/100 |
| 4,101,704 | 7/1978 | Hiles . |
| 4,105,594 | 8/1978 | Dieterich ............. 521/100 |
| 4,241,806 | 12/1980 | Metzger . |
| 4,476,258 | 10/1984 | Hiles et al. . |
| 4,482,590 | 11/1984 | Bouley et al. . |
| 4,722,946 | 2/1988 | Hostettler . |
| 4,744,842 | 5/1988 | Webster et al. . |
| 4,839,397 | 6/1989 | Lohmar et al. . |
| 4,916,167 | 4/1990 | Chen et al. . |
| 5,063,253 | 11/1991 | Gansen et al. . |
| 5,138,588 | 8/1992 | Chuan et al. . |

*Primary Examiner*—Morton Foelak
*Attorney, Agent, or Firm*—Finnegan, Henderson, Farabow, Garrett & Dunner

[57] ABSTRACT

A polyurethane composite for the attenuation of sound having a two part polyurethane binder, a high density particulate filler having a specific gravity greater than 2.0 and a very low density void forming filler having a specific gravity less than 0.50.

19 Claims, No Drawings

SOUND ATTENUATING POLYMER COMPOSITES

BACKGROUND OF THE INVENTION

1. Field of the Invention.

This invention relates to polymer composites and more particularly to sound attenuating polyurethane composites.

2. Description of the Prior Art.

Many compositions and processes have been proposed for attenuating sound including the use of various polymer composites. However, there have been numerous difficulties associated with the use of the different composites. Cross-linked rubber composites, for instance, require large, expensive processing machinery. In manufacturing certain sound attenuating composites, such as those made from thermoplastics, there are high internal mold pressures and the polymers must be processed in high pressure processing equipment including very strong molds and special clamping mechanisms. Alternatively, the polymers are processed separately in sheet form and adhered to the end product. Thermoplastic type composites are described in, for example, U.S. Pat. No. 4,241,806.

Some sound attenuating composites use physical or chemical blowing agents to form voids which dissipate acoustic energy as sound waves travel through the composites. However, the use of chemical and physical blowing agents creates gas generated pressures, which can cause large internal forces within confining molds. Consequently, very strong molds and expensive clamping mechanisms are necessary to contain such internal forces.

Two-part polyurethane composites are recognized in the art for energy-absorbing properties. Many of these polyurethanes use a 2000 molecular weight polytetramethylene ether glycol which crystallizes at lower temperatures and produces an undesirable abrupt increase in modulus. In certain instances the composites of the prior art are flammable and have burning characteristics which promote the spread of fire.

Thus, there is a need for a polyurethane binder which does not crystallize at lower temperatures such as, e.g., a temperature range of about −10° C. to 70° C.

There is also a need for a composite having excellent damping properties at lower temperatures than most polymers.

There is a need for a composite which may be processed with relatively inexpensive processing equipment such as standard low pressure processing equipment. Since it is desired that no pressure be developed inside the mold while forming the expanded polymer, it would be desirable to provide an expanded composite without using gas generating substances in the polymer.

There is also a need for a composite which has superior resistance to flame propagation and superior non-drip burning characteristics, which inhibit the spread of a fire.

Finally, there is a need for a polyurethane polymer formulated such that the acoustic energy dissipation mechanism of the polymer is optimized, at the required temperature of use and frequency of generated sound.

SUMMARY OF THE INVENTION

Accordingly, the present invention is directed to a polymer composite that substantially obviates one or more of the limitations and disadvantages of the related art.

In particular, the present invention is directed to a polymer composite containing a combination of a high density filler and a low density void forming filler which is useful for sound attenuation. A random distribution of both fillers, i.e., the high density filler and the low density void forming filler, is bound together by a viscoelastic polymer composite.

In accordance with the present invention, there are provided polyurethane, polyurea or polyurethane/polyurea hybrid composites. These composites contain a two-part polyurethane, polyurea or polyurethane/polyurea hybrid binder, a high density particulate filler having a specific gravity greater than about 2.0 which is substantially noncorrosive or non-reactive in sea-water, and a very low density void forming filler having a specific gravity less than about 0.50. The polymer composites of the present invention may optionally contain a thixotrope. The polymer composites of the present invention do not contain any blowing agents.

The high density particulate filled polymer greatly diminishes the rate at which the speed of sound passes through the composites and provides substantially corrosive-free composites in a water environment. Substantially corrosive-free means that the composite does not corrode to the extent that performance of the composite is affected.

The composites of the present invention are useful, inter alia, for the attenuation of sonic energy in underwater devices. The composites of the present invention have provided unexpectedly high echo reduction when used in conjunction with underwater devices, e.g., in excess of 10 decibels of echo reduction over the frequency range of 10 kHz–100 kHz. The composites also exhibit high values of transmission loss of 5 dB to 30 dB from 20 kHz to 100 kHz.

The fillers used in the present invention are provided in a random distribution and can be in a relative proportion such that the resulting composite has neutral or negative buoyancy when immersed in sea waters. The resulting composite preferably has resilient characteristics such that after being subjected to severe hydrostatic compression, its shape and form is recoverable, following decompression on return to atmospheric conditions.

Voids in the composite of the present invention are obtained from filler materials which already contain voids, and as used herein, void forming filler is defined as a filler material already containing voids which is added to the polymer binder to form voids therein. Low density void forming fillers are those having a specific gravity of less than about 0.50.

It is to be understood that both the foregoing general description and the following detailed description are exemplary and explanatory only and are not restrictive of the invention, as claimed.

DETAILED DESCRIPTION

The polymer component of the polymer composites of the present invention, i.e., the binder, is derived from a two-part polyurethane, a two-part polyurea or a two-part polyurethane polyurea hybrid.

Conventional two-part polyurethane, polyurea or polyurethane/polyurea hybrid binders may be used in the present invention. The polyurethane, polyurea or hybrid thereof is preferably visco-elastic and has a dynamic mechanical loss factor (tangent delta) greater than 0.2, preferably greater than 0.4. Two-part binders are well-known in the art such as those disclosed in U.S. Pat. Nos. 4,722,946 and 4,476,258 which are hereby incorporated by reference in their entirety.

The term polyurethane, as used herein, refers to polymers formed by reaction of polyhydroxy substances with polyisocyanates. Polyureas are the reaction products of amine terminated polyfunctional substances with polyisocyanates. Thus, a hybrid polyurethane/polyurea is an isocyanate type polymer in which both these connective groups, i.e., urethane and urea, are present. Slight traces of water in the initial ingredients, after reaction with an isocyanate, cause some urea linkages in the polymer. Thus, practically all polyurethanes could be called hybrids, since it is virtually impossible to exclude all traces of moisture from the initial reactants. Generally, the reaction rate of an amine terminated polymer or short chain extender with aromatic isocyanates is too high for making useful reaction products in accordance with the present invention. However, there are certain amine terminated polymeric materials in which the reactivity of the amine groups has been passivated by being associated with sterically hindered or withdrawing electrophilic groups. An example of such a material is polytetramethylene oxide-di-p-aminobenzoate, molecular weight 1238, otherwise known by the trade name, Polamine TM-1000. This material is also useful for practice of the present invention, when compounded with the appropriate filler materials and reacted with a suitable polyisocyanate. Such a polymer reaction product is appropriately termed a polyurea and requires no short chain extenders to effect a cured product.

The above examples all refer to preparing the polyurethanes or polyurea products by a process called a one shot reaction. That is, there is no attempt to prereact any portion of the isocyanate with the polyol or polyamine substances. This type reaction permits lower viscosity components into which the fillers are blended. The present invention does not preclude using a prepolymer in which part or all of the isocyanate is prereacted with the other substances; however, the one shot technique is preferred.

Specifically, the first component of a two-part polyurethane binder is a polyisocyanate or a mixture of polyisocyanates, and the second component of the two-part polyurethane binder contains at least one polyol or polyamine. Although there is no limit on the number of polyisocyanates in the mixture of polyisocyanates, it is generally preferred that the mixture contain 1 to 3 polyisocyanates, more preferably one polyisocyanate. There is also no limit on the number of polyols in the second component; however, it is generally preferred that the second component contain from 1 to about 4 polyols and most preferably 3 polyols.

The diisocyanate used in compositions of the present invention may be any of the diisocyanate materials conventionally used in formation of polyurethane materials. Aromatic diisocyanates are preferred.

Preferably, the polyisocyanate or mixture of polyisocyanates contains 4,4'-diphenylmethane diisocyanate having a functionality of about 2.0 to 2.9. These polyisocyanates may be modified with the incorporation of the 2,4'-diphenylmethane diisocyanate isomer or with carbodiimide groups.

Although one polyol can be used, the second component of the two-part polyurethane binder preferably contains at least two polyols selected from:

(1) polytetramethylene ether glycol having a molecular weight of about 250 to 6000, a preferred diol being a polytetramethylene ether glycol having a molecular weight of about 2000;

(2) poly(oxypropylene)diol having a molecular weight of about 100 to 10,000; and/or (3) a low molecular weight diol having the general formula OH-R-OH where R represents an alkyl group having less than 10, and preferably 2-6, carbon atoms which may be branched, e.g., secondary and tertiary, or unbranched and unsubstituted. Preferred alkyl groups are butyl, iso-butyl, propyl, isopropyl, ethyl, methyl and the like.

The polymer should provide good mechanical damping properties which are useful for acoustic attenuation. The region of maximum energy absorption of the polymer occurs in the region of the glass transition. Hence, by formulating the polymer such that the glass transition is located at the use temperature and frequency, the energy attenuating properties of the polymer are optimized.

A high density particulate filler having a specific gravity greater than about 2.0, preferably greater than 5.0, which is substantially noncorrosive or non-reactive in sea-water is added, for example, to the polyol component of a polyurethane. Preferably the high density particulate filler used in the composite of the present invention contains powdered stainless steel or a mixture containing powdered stainless steel. Powdered stainless steel is preferred since it has a high specific gravity of about 7.9, does not corrode, and does not have toxicological problems associated with it. Although there is no particular upper limit for the specific gravity of the high density particulate filler used in the composite of the present invention, it is generally preferred that the specific gravity of the high density filler be about 2.0 to 20.0.

Mixtures containing powdered stainless steel or other high density particulate fillers or mixtures thereof may be used as long as a average specific gravity greater than about 2.0 is maintained and as long as the mixture does not corrode to the extent that performance of the composite is affected. Examples of other fillers which may be used with stainless steel, alone or in mixtures to obtain the desired properties are copper, lead, titanium, titanium dioxide, barium sulfate, zinc oxide, antimony oxide, zirconium oxide, silicon dioxide, pumice, calcium carbonate, barium carbonate, cuprous oxide, zinc sulfide, sodium silicate, aluminum silicate, mica, tungsten, uranium, gold, silver, platinum and iridium.

Although there are no particular upper or lower limits on the amount of high density particulate filler which may be used in the composites of the present invention, because the rate of the speed of sound through the composite varies inversely to the density of the composite, the high density particulate filler is used in the polymer binder, in accordance with the present invention, in an amount sufficient to produce the desired effect. Therefore, the specific gravity of the high density particulate should be greater than 2.0 and that of the low density particulate should be less than 0.50. It is generally preferred that about 1 percent to about 80 percent by weight of the high density particulate filler be used in the composites of the present invention (the weight % being based on the total weight of the composite). The high density particulate filler may be any shape as long as the filler is uniformly distributed throughout the uncured polyurethane components.

Preferred high density particulate fillers are powders or flakes having a mesh size from about +30 to −400 mesh, preferably about 325 mesh.

The movement interactions between the filler particles and the polymer attenuate acoustic energy. The shape and the mass of the particles are also influencing factors in attenuating the sonic energy.

In accordance with the present invention, a very low density void forming filler having a specific gravity less than about 0.50, preferably less than about 0.10, is added to the polyol. The lower limit of the specific gravity of the low density void forming filler is not critical. In preferred embodiments, the specific gravity of the void forming filler is about 0.03 to 0.06. The voids are not formed in the composite by blowing agents and blowing agents are not used in the composites of the present invention. In accordance with the present invention, voids are formed in the composite only by the use of a preformed filler material having the designated specific gravities, i.e., less than about 0.50.

Voids can be provided in the composite from synthetic or natural materials which already contain voids. The void forming fillers are predispersed into, for example, the polyol mixture for acoustical considerations. These voids are preferably obtained in the composites of the present invention from polymeric hollow microspheres. The shell of the hollow microspheres may be composed of, for example, soda-lime-borosilicate glass, $SiO_2/Al_2O_3$, epoxy, or acrylonitrile, polyvinylidene chloride, methyl methacrylate or combinations thereof such as methyl methacrylate/polyvinylidene chloride copolymer, methyl methacrylate/acrylonitrile copolymer, polyvinylidene/acrylonitrile copolymer and methyl methacrylate/acrylonitrile/polyvinylidene copolymer. Although there are no critical upper or lower limits on the amounts of void forming or void containing filler material which can be used in the composites of the present invention, the void containing material is added in a sufficient amount to attenuate sound. The attenuation of sound can occur through intrinsic dissipation, conversion of a longitudinal deformation to a shear deformation and scattering of sound to a back propagating wave.

The void containing material is incorporated into the polyol mixture in amounts to achieve the desired sound attenuating effect, preferably in amounts of about 1 vol % to about 70 vol %, more preferably about 1 vol % to about 50 vol % and most preferably about 10 vol %.

A thixotrope or anti-settling agent may optionally be added to the polymer mixture in sufficient amounts to inhibit the stratification of the high density particulate filler and the low density void forming material from the polymer binder.

The thixotrope may be added to a component of the prereacted polymer, for example, the polyol, to allow the component to be stored for over six months without significant stratification occurring. Also, the addition of the thixotrope to the polyol aids in processing the composite using conventional processing equipment for compounding two-component materials thereby preventing, for example, the fouling of the pumps due to the settling of the high density particulate filler. A thixotrope is any agent which inhibits the stratification of the polyol component without adversely affecting the composite. Examples of thixotropes useful in the present invention are fumed silica and bentonite clays. A preferred thixotrope is a colloidal fumed silica. Although the amounts of thixotrope used in accordance with the present invention are not critical, and the use of thixotrope is optional, typically 0 wt % to about 10 wt % is used.

Other optional additives which may be present, such as in the polyol component of the composites of the present invention, are organometallic catalysts. The organometallic catalyst is present in sufficient amounts to catalyze the isocyanate/hydroxyl reaction in forming the polyurethane binder component. Such organometallic catalysts include, e.g., bismuth, cobalt, mercury, potassium, lead and tin organometallic compounds which are well-known in polymer chemistry. A preferred catalyst is bismuth neodecanate.

Without the addition of catalyst to the formulation an oven post cure is generally required to produce a polymer having maximum properties in a short period of time. The addition of catalyst to the polymer formulation allows the polyurethane reaction to proceed readily so that an oven post cure may not be required. In certain aspects of the present invention, an effective amount of catalyst is added to the polymer formulation, to promote the curing of the polymer. Thus, in accordance with the present invention, the catalyst is optional and typical amounts of the catalyst are 0 wt % to about 1 wt %.

The polymer may also contain other fillers and additives which are well known in the art, for example, fire retarding additives, marine and biological growth preventing agents, coloring agents or preservatives. U.S. Pat. Nos. 4,722,946 and 4,476,258 illustrate various filler materials which may be used in polyurethane composites. The fillers cannot interfere with the basic property requirements or compromise the physical integrity of the composite. The fillers should be homogeneously distributed throughout the polymer.

Molded articles may be made with a machine processor or with batch processing methods. For example, the polyisocyanate and polyol are preblended. The additives are usually preblended with the polyol. Then the two preblended mixtures are mixed and shot into a mold at a temperature sufficient to aid processing. The molded material is cured at a temperature sufficient to cure the polyurethane polymer. The heat of reaction may be sufficient to cure, or additional heat may be added by using external sources as well known to those skilled in the art.

The composites may be molded directly on various substrates, such as metals, plastics, woods and ceramics which may be used above or below water. The molds may be of any geometric shape including slabs, prisms and wedges as known in the art or they may be made to conform to the contours of any surface as desired. The invention will be further clarified by the following examples, which are intended to be purely exemplary of the invention.

As used herein, unless expressed otherwise, wt % is the weight % based on the total weight of the composite.

EXAMPLES

Example 1

Several molded parts were made in accordance with the following:
(1) "A" component:
  1.80 equivalents of a polymeric MDI having a functionality of 2.2
(2) "B" component:

0.75 equivalents of polytetramethylene ether glycol (PTMEG) having a nominal molecular weight of 1000, 0.25 equivalents of PTMEG having a nominal molecular weight of 2000, and 0.75 equivalents of 1,4-butanediol, with 2.2 wt % of a hollow polymeric microsphere composed of polyvinylidene chloride, methyl methacrylate, and acrylonitrile copolymer having a nominal specific gravity of 0.04 and 73.5 wt % powdered 304 L stainless steel having a U.S. mesh size of 325.

The "B" component was prepared by charging the glycols into a double planetary type mixer which was maintained at a maximum of 110° to prevent crystallization of glycols. The microspheres were added to the glycol mixture and mixed at the slowest speed until the microspheres were thoroughly wetted. Next, the powdered stainless steel was added to the mixture through a port while the mixer was rotating. The powdered stainless steel was added such that the powder was blended into the mixture without the powder settling to the bottom. This "B" component was vacuum degassed with agitation to remove entrained air (4–18 hours). After the "B" component had been thoroughly degassed, the "A" component was added to the mixer and blended under the vacuum for 5 to 10 minutes to achieve a homogeneous blend. This reacting mass was poured into a mold which was placed into a 175° F. oven to react. After 18 to 24 hours the finished parts were demolded.

Superior flame resistance of the resulting copolymers were indicated by visual tests.

Example 2

(1) "A" component:

3 equivalents of a mixture of 70% 4,4'-diphenylmethane diisocyanate and 30% 2,4'-diphenylmethane diisocyanate (2) "B" component:

1 equivalent of PTMEG having a nominal molecular weight of 2000, 2 equivalents of 1,3-butanediol, 0.3 wt. % of hollow copolymeric microspheres composed of polyvinylidene chloride, acrylonitrile, and methyl methacrylate copolymer, 4 wt % fumed silica, 68 wt % 304 L powdered stainless steel, having a US mesh size of 325 and 0.02% bismuth neodecanoate catalyst.

This formulation was processed using a two component processing machine which had a dynamic mixer, a gear pump for the "A" component and a lobe pump for the "B" component. The "B" component was prepared in a large mixer by charging the mixer with the glycols, adding the fumed silica and mixing for about 15 minutes to disperse the fumed silica. The microspheres and catalyst were added to the mixture and blended until the microspheres were fully wetted. With the mixer rotating, the stainless steel powder was added through a port at a slow rate so that the powder was dispensed without settling to the bottom of the mixer. This mixture was vacuum degassed while maintaining a temperature of between 110° F. to 130° F. and mixing to remove entrained air—(18 hours). This "B" component was transferred to a supply tank of the two component processor where the temperature was maintained at 120° F.

The "A" component was placed in a separate supply tank on the processing machine. The machine pumps, meters, and mixes the two components. This reacting mixture was dispensed into a mold. The part was demolded after about 18 hours at room temperature.

Example 3

(1) "A" Component:

1 equivalent of a carbodiimide modified 4,4'-diphenylmethane diisocyanate (2) "B" Component:

1 equivalent of polytetramethyleneglycol-di-p-amino benzoate having a nominal molecular weight of 1200

0.5 wt % of hollow microspheres composed of a copolymer of vinylidene chloride, acrylonitrile, and methyl methacrylate 2 wt % fumed silica and 60 wt % 304 L powdered stainless steel having a US mesh size of 325.

This formulation was prepared and processed in a similar fashion to that shown in Example 2. This sample was demolded in 4 hours.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer composite for the attenuation of sound comprising:
   (a) a two-part polyurethane, polyurea or polyurethane/polyurea hybrid viscoelastic binder;
   (b) a high density particulate filler having a specific gravity greater than 5.0 which is substantially non-corrosive in sea-water; and
   (c) a low density hollow polymeric microsphere filler having a specific gravity less than 0.50;

wherein the high density particulate filler and the low density hollow polymeric microsphere filler are present in amounts sufficient to attenuate sound.

2. The polymer composite of claim 1, wherein a two-part polyurethane is present and comprises a first component comprising a polyisocyanate and a second component comprising a polyol.

3. The polymer composite of claim 2, wherein the first component is a 4,4'-diphenylmethane diisocyanate having a functionality of 2.0 to 2.9.

4. The polymer composite of claim 2, wherein the polyisocyanate is modified by the incorporation of a 2,4'isomer or carbodiimide groups.

5. The polymer composite of claim 2, wherein the second component comprises at least two polyols selected from:
   (a) polytetramethylene ether glycol having a molecular weight of 250 to 6000;
   (b) poly(oxypropylene)diol having a molecular weight of 100 to 10,000; and
   (c) a low molecular weight diol of the formula OH—R—OH, wherein R is an unsubstituted, branched or unbranched, alkyl group having less than 10 carbon atoms.

6. The polymer composite of claim 5, wherein R is 2-6 carbon atoms.

7. The polymer composite of claim 5, wherein the polytetramethylene ether glycol has a molecular weight of 2000.

8. The polymer composite of claim 1, wherein the high density particulate filler has a specific gravity of greater than 5.0.

9. The polymer composite of claim 1, wherein the high density particulate filler is powdered stainless steel or a mixture containing powdered stainless steel having an average specific gravity of greater than 5.0.

10. The polymer composite of claim 1, wherein the low density hollow polymeric microsphere filler has a specific gravity of less than 0.10.

11. The polymer composite of claim 1, wherein the hollow microspheres have a shell which comprises soda-borosilicate glass, $SiO_2/Al_2O_3$, epoxy, acrylonitrile, polyvinylidene chloride, methyl methacrylate copolymers or mixtures thereof.

12. The polymer composite of claim 1, further comprising an organo metallic catalyst.

13. The polymer composite of claim 12, wherein the organic catalyst is selected from the group consisting of bismuth, cobalt, mercury, potassium, lead and tin organometallic compounds.

14. The polymer composite of claim 13, wherein the organic catalyst is bismuth neodecanate.

15. The polymer composite of claim 12, wherein the catalyst is present in an amount from 0 wt % to 1 wt %.

16. The polymer composite of claim 1, further comprising a thixotrope.

17. The polymer composite of claim 16, wherein the thixotrope is selected from the group consisting of fumed silica and bentonite clays.

18. The polymer composite of claim 16, wherein the thixotrope is colloidal silica.

19. The polymer composite of claim 16, wherein the thixotrope is present in an amount from 0 wt % to 10 wt %.

* * * * *

UNITED STATES PATENT AND TRADEMARK OFFICE
CERTIFICATE OF CORRECTION

PATENT NO. : 5,378,733
DATED : January 3, 1995
INVENTOR(S) :
Lester W. Bates and Eric P. Buchanan It is certified that error appears in the above-indentified patent and that said Letters Patent is hereby corrected as shown below:

Delete Claim 8, column 9, lines 4-6.

Renumber claims 9-19.

Change dependency of claims to reflect renumbered claims.

In the Abstract:

Change "19 claims" to read -- 18 claims --.

Signed and Sealed this

Eighteenth Day of April, 1995

Attest:

BRUCE LEHMAN

*Attesting Officer*

*Commissioner of Patents and Trademarks*